(12) United States Patent
Dreer et al.

(10) Patent No.: US 9,743,588 B2
(45) Date of Patent: Aug. 29, 2017

(54) HARVESTING MACHINE HEADER CONNECTION

(71) Applicant: AGCO International GmbH, Hesston, KS (US)

(72) Inventors: Constantin Dreer, Illertissen (DE); Johannes Haehnel, Zwickau (DE)

(73) Assignee: AGCO International, Neuhausen (CH)

( * ) Notice: Subject to any disclaimer, the term of this patent is extended or adjusted under 35 U.S.C. 154(b) by 0 days.

(21) Appl. No.: 14/785,062

(22) PCT Filed: Mar. 27, 2014

(86) PCT No.: PCT/EP2014/056197
§ 371 (c)(1),
(2) Date: Oct. 16, 2015

(87) PCT Pub. No.: WO2014/173617
PCT Pub. Date: Oct. 30, 2014

(65) Prior Publication Data
US 2016/0057934 A1    Mar. 3, 2016

(30) Foreign Application Priority Data

Apr. 26, 2013  (GB) .................................. 1307547.8

(51) Int. Cl.
*A01D 34/00* (2006.01)
*A01D 67/00* (2006.01)
(Continued)

(52) U.S. Cl.
CPC ......... *A01D 67/005* (2013.01); *A01D 41/142* (2013.01); *A01D 41/16* (2013.01); *A01D 69/02* (2013.01); *A01D 69/03* (2013.01)

(58) Field of Classification Search
CPC ........ A01B 71/06; A01D 41/16; A01D 41/14; A01D 45/021
(Continued)

(56) References Cited

U.S. PATENT DOCUMENTS 2,869,660 A    1/1959   Miller et al.
3,324,637 A *  6/1967   Windsor ................ A01D 41/16
                                                              56/15.6
(Continued)

FOREIGN PATENT DOCUMENTS

BE    1018781 A3    8/2011
EP    1884151 A1    2/2008
(Continued)

OTHER PUBLICATIONS

European Patent Office, International Search Report for International Application No. PCT/EP2014/056197, mailing date Jun. 17, 2014.

(Continued)

*Primary Examiner* — Árpád Fábián-Kovács

(57) ABSTRACT

A drive arrangement for a harvesting header of a harvesting machine having a running gear on which a feeder housing is mounted. A front side of the feeder housing has a header mount that moves relative to the feeder housing and on which the harvesting header is detachably fastened. An automated coupling mechanism is provided to link a driven shaft from the harvesting machine to a drive shaft of the harvesting header as the header is connected to the harvesting machine. The drive connector connected with the header mount is movable relative thereto during the attachment of the harvesting header to axially align the driven shaft and drive shaft as the harvesting header approaches the feeder housing during the attachment to accommodate differing header drive shaft orientations.

9 Claims, 10 Drawing Sheets

(51) Int. Cl.
*A01D 41/14* (2006.01)
*A01D 41/16* (2006.01)
*A01D 69/02* (2006.01)
*A01D 69/03* (2006.01)

(58) Field of Classification Search
USPC .................. 56/15.6, 14.9, DIG. 9; 460/16
See application file for complete search history.

(56) References Cited

U.S. PATENT DOCUMENTS

| | | | | |
|---|---|---|---|---|
| 3,431,711 | A * | 3/1969 | Claas | A01D 41/12 56/14.5 |
| 4,707,972 | A * | 11/1987 | Knepper | A01D 41/14 460/16 |
| 6,519,923 | B1 * | 2/2003 | Cooksey | A01B 71/08 56/14.9 |
| 6,619,020 | B1 * | 9/2003 | Chaney | A01D 41/142 56/10.9 |
| 6,735,929 | B2 * | 5/2004 | Watts | A01D 41/16 56/14.9 |
| 7,497,459 | B2 * | 3/2009 | Johnson | A01D 41/16 280/515 |
| 8,061,114 | B2 * | 11/2011 | Mossman | A01D 41/14 56/119 |
| 8,322,122 | B2 | 12/2012 | Dold et al. | |
| 9,137,946 | B2 * | 9/2015 | Verhaeghe | A01D 41/16 |
| 2008/0271425 | A1 * | 11/2008 | Ricketts | A01D 41/16 56/15.6 |
| 2012/0102905 | A1 | 5/2012 | Dold et al. | |
| 2012/0317951 | A1 * | 12/2012 | Vereecke | A01D 41/16 56/14.9 |

FOREIGN PATENT DOCUMENTS

| | | |
|---|---|---|
| EP | 1987713 A1 | 11/2008 |
| WO | 2011/095525 A1 | 8/2011 |

OTHER PUBLICATIONS

Intellectual Propert Office, International Search report for Priority Application No. GB1307547.8, transmittal dated Sep. 27, 2013.

* cited by examiner

HARVESTING MACHINE HEADER CONNECTION

BACKGROUND OF THE INVENTION

Field of Invention

The present invention relates to agricultural harvesting machines and particularly, but not exclusively, to forage harvesters which are provided with a front mounted header which may include a cutting mechanism and which is mounted on a crop feeding mechanism which feeds the cut crop from the header into the harvesting machine for further processing.

Discussion of Related Art

As is well known, harvesting machine headers are typically much wider than the remainder of the machine and have to be removed for transport by road. Additionally, in the case of forage harvesters, different configurations of header may be provided for the same harvesting machine in order to handle the different requirements of crops such as grass and maize.

Attaching and detaching a header from a harvesting machine can be a labour-intensive task, particularly in terms of making or breaking the necessary driveline connection providing motive power from the harvester motor to the header for operating header knives, augers and similar driven components. Such a process may be further complicated if the header is provided with a rolling mount which allows the header to pivot about an axis parallel with the direction of travel, in order to accommodate movement caused by uneven ground.

One known system which seeks to address some of these issues is described in U.S. Pat. No. 8,322,122 which provides a drive arrangement for a harvesting header of a harvesting machine having a running gear on which a feeder housing is fastened. A front side of the feeder housing has a header mount that moves relative to the feeder housing and on which a harvesting header is detachably fastened. The drive arrangement comprises a driven shaft that is set in rotation by the harvesting machine and is connected with the header mount, and a harvesting header drive shaft of the harvesting header is connected to the harvesting header-driven shaft in a driving way by a coupling having two coupling halves that automatically separate when the harvesting header is disassembled from the header mount and automatically connect when the harvesting header is attached on the header mount.

The aim of the arrangement of U.S. Pat. No. 8,322,122 is to enable the operator of the harvesting machine to simply drive up and engage the header without leaving the cab of the vehicle. Such an arrangement requires that the physical connecting points between the header and header mount must be aligned, and also that the connecting portions between the driven shaft of the header and driving shaft from the vehicle are aligned with each other and with the connecting points between header and mount. Problems arise if there is not alignment, as may be the case where the header is supplied by a different manufacturer to the harvesting machine.

It is an object of the present invention to provide a harvesting machine which at least partially mitigates the above attachment problem.

OVERVIEW OF THE INVENTION

Thus in accordance with the present invention there is provided a drive arrangement for a harvesting header of a harvesting machine having a running gear on which a feeder housing is mounted, a front side of the feeder housing having a header mount that moves relative to the feeder housing and on which a harvesting header is detachably fastened, the drive arrangement comprising a driven shaft that is set in rotation by the harvesting machine and is connected with the header mount, and a harvesting header drive shaft of the harvesting header is connected to the harvesting header-driven shaft in a driving way by a coupling having two coupling halves that automatically separate when the harvesting header is disassembled from the header mount and automatically connect when the harvesting header is attached on the header mount, wherein the driven shaft coupling connected with the header mount is movable relative thereto during the attachment of the harvesting header. By enabling movement of the driven shaft coupling relative to the header mount, a degree of tolerance is introduced which can enable a wider range of headers, perhaps from different manufacturers or of different configurations, to be used with automated attachment of a pivoting header.

The driven shaft coupling suitably includes guidance means shaped to axially align the driven shaft and drive shaft as the harvesting header approaches the feeder housing during the attachment. Such guidance means may comprise a funnel-shaped portion connected with one of the drive shaft and driven shaft and arranged to bring a free end of the other of the driven shaft and drive shaft into alignment as the harvesting header approaches the feeder housing during the attachment.

Other features of the present invention are set out in the accompanying dependent claims.

BRIEF DESCRIPTION OF THE DRAWINGS

Embodiments of the present invention will now be described, by way of example only, with reference to accompanying drawings in which.

DETAILED DESCRIPTION OF THE INVENTION

Figure 1:
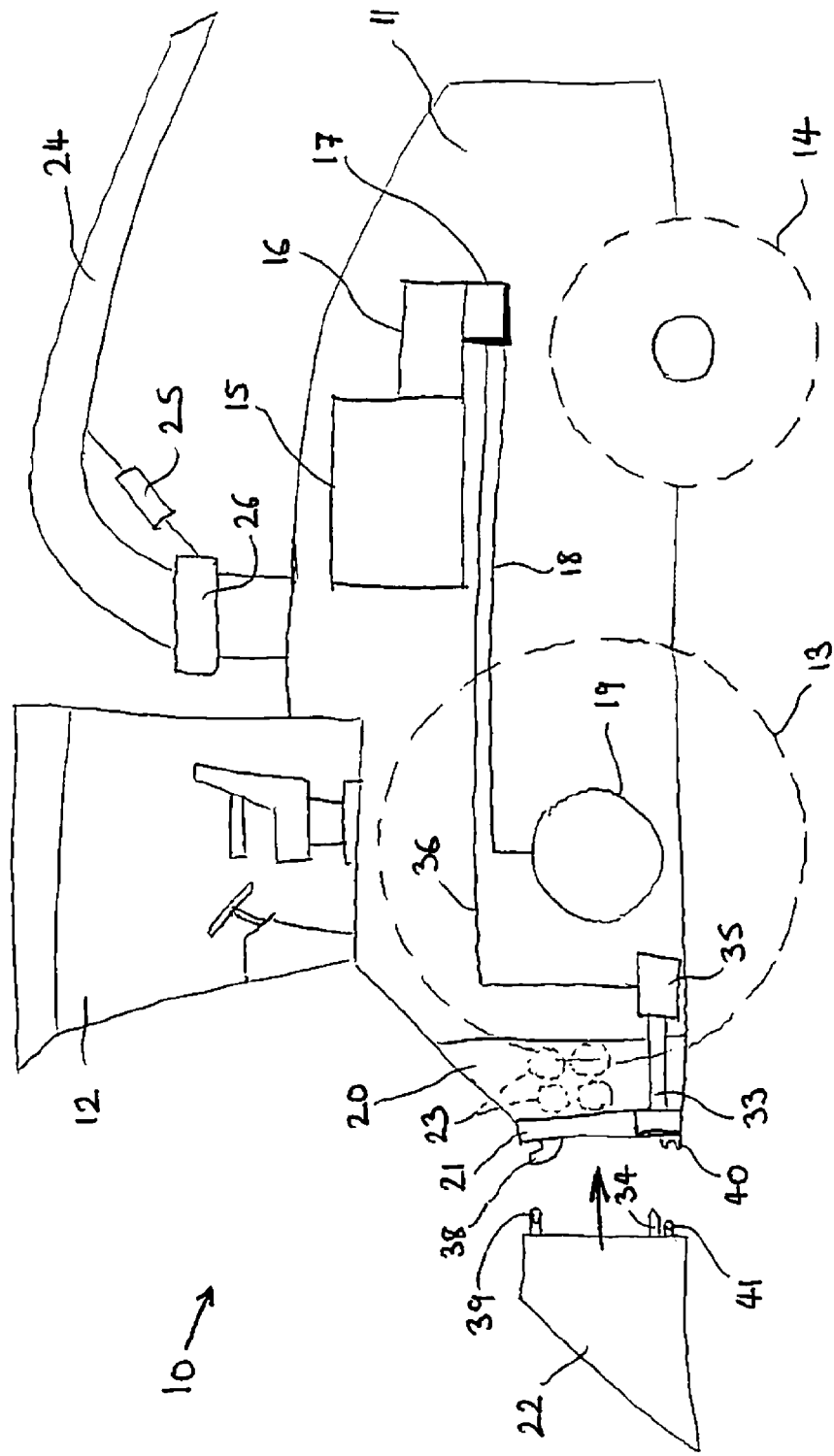
FIG. 1 is a schematic representation of a forage harvester having a header drive arrangement according to the present invention.

Referring to the drawings, FIG. 1 shows a forage harvester 10 having a body 11 and a cab 12 which are supported on a running gear comprising front driven wheels 13 and rear steerable wheels 14. In the arrangement shown, the front wheels 13 are driven by an engine 15 via a gearbox 16 which drives a hydraulic pump 17 which is connected by lines 18 with hydraulic motors 19 associated with each front wheel.

At the forward end of the body a feeder housing 20 is provided with a pivoting header mount 21 to which a harvesting header 22 is detachably fastened. The crop cut by the header 22 (which can be of the reciprocating type or rotary type) is passed through the header mount 21 to the feeder housing 20 which conventionally comprises pairs of compression rolls 23. From the feeder housing, the cut crop is fed to a processing stage (not shown) which typically comprises a knife drum where rotating knives cut the crop in cooperation with an adjustable cutter bar into predetermined length crop elements which are then fed into a discharge chute where the cut crop is accelerated into to a discharge spout 24 by a crop accelerator. As is conventional the height and angle of the spout 24 relative to the body 11 is adjustable by a hydraulic cylinder 25 and a hydraulically driven spout rotation device 26.

Figure 2:
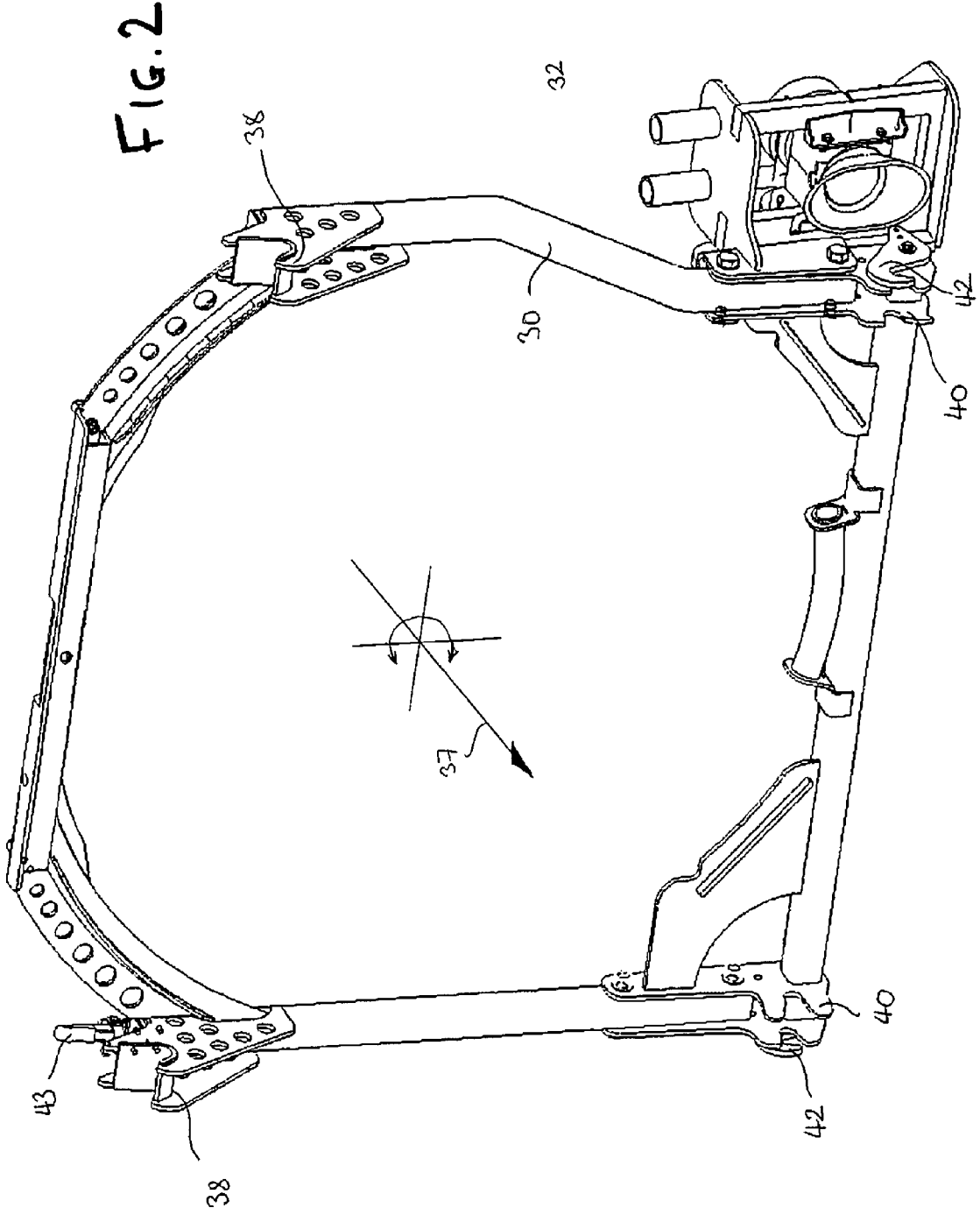
FIG. 2 shows a header mounting frame with a quick coupling arrangement.

Referring additionally to FIG. 2, the header mount 21 comprises an open frame 30 with a quick coupling arrangement 32 for automatic coupling of a driven shaft 33 from the harvester to a harvesting header drive shaft 34. The driven shaft 33 from the harvester may be directly driven by engine 15 or, as shown, a separate hydraulic motor 35 powered by pump 17 via lines 36 may drive the shaft 33. The mounting of driven shaft 33 and connection to motor 35 (suitably via a universal joint coupling and telescoping spline drive connection) is such as to permit a degree of horizontal and/or vertical motion of the end of the shaft 33 distant from the motor as the header mount 21 moves relative to the feeder housing 20.

The header mount 21 is attached to the feeder housing 20 in a manner which permits it to move in a plane perpendicular to the general front to rear direction of the harvester, suitably pivoting about an axis 37 passing through the centre of the header mount 21. A pair of upper mounting points 38 are fixedly attached to the frame 30, at the upper end of respective upright side members of the frame, and cooperate with respective mounting bars 39 of the header 22 which hook onto the mounting points 38. At the lower end of each of the frame side members a respective lower mounting point 40 is fixedly attached to the frame. These lower mounting points 40 cooperate with respective lower mounting bars 41 on the harvesting header, such that the upper and lower mounting points 38, 40 and mounting bars 39, 41 provide four fixed attachment points between header and mount. With this arrangement a driver need not leave the driver's cab 12 for coupling the header 22 to the harvesting machine—simply drive up to align the mounting points with the mounting bars and raise the feeder housing 20 to cause engagement. This is suitably accompanied by automated connection arrangements (not shown) for electrical and/or hydraulic connection between the machine and header.

As shown at 42 (FIG. 2) a pivoting catch mechanism may be provided to lock the header in place when the mounting bars have engaged the mounting points. By actuating lever 43, the catch mechanism can be moved between the locked and unlocked positions. Although not shown, it will be appreciated that electrical or mechanical actuator means, operable from the cab, may be provided in place of (or in addition to) manual lever 43 to engage or release the pivoting catch mechanism 42.

Figure 3:
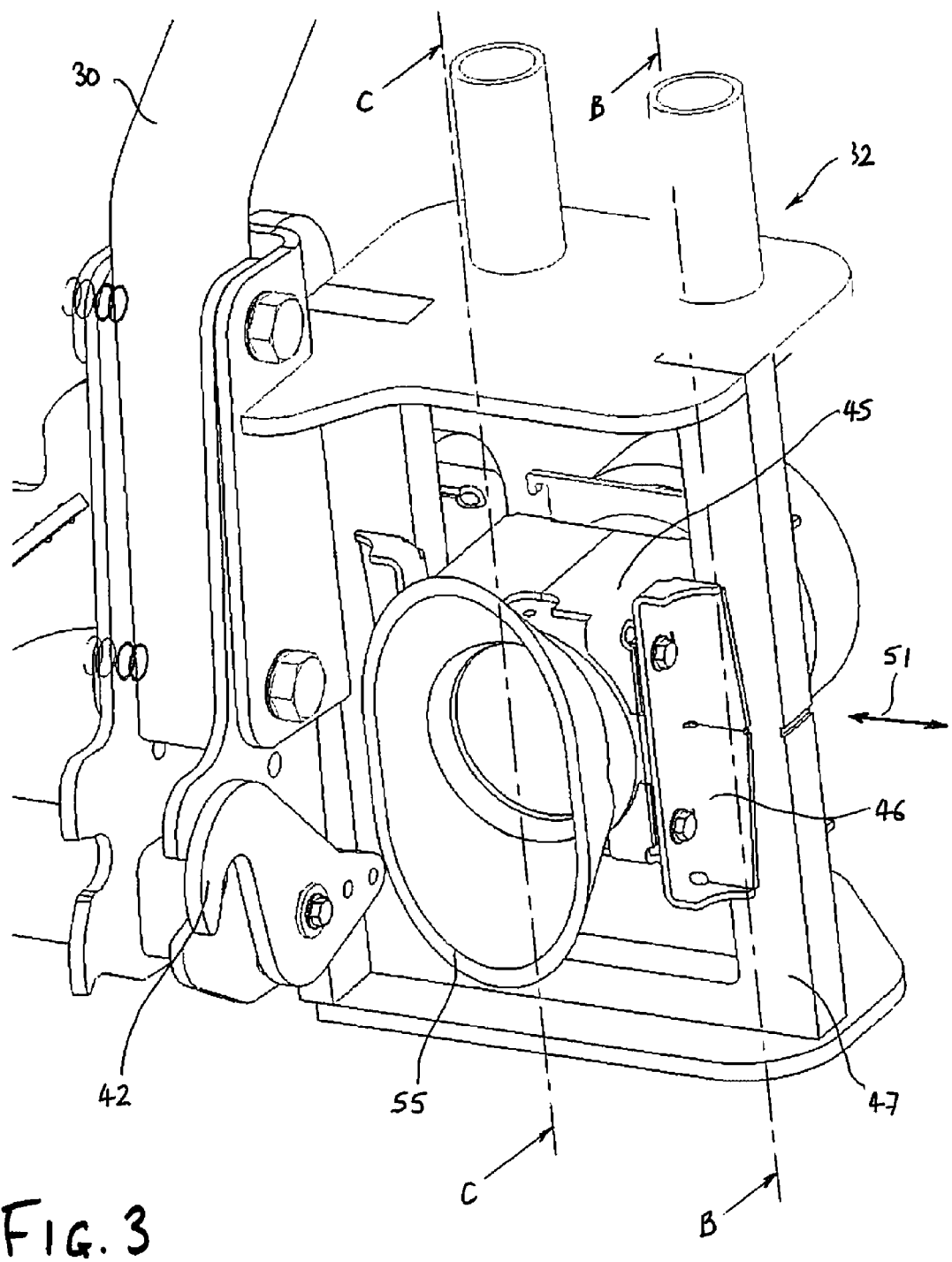
FIG. 3 shows a detail of the quick coupling arrangement of FIG. 2.
Figure 4:
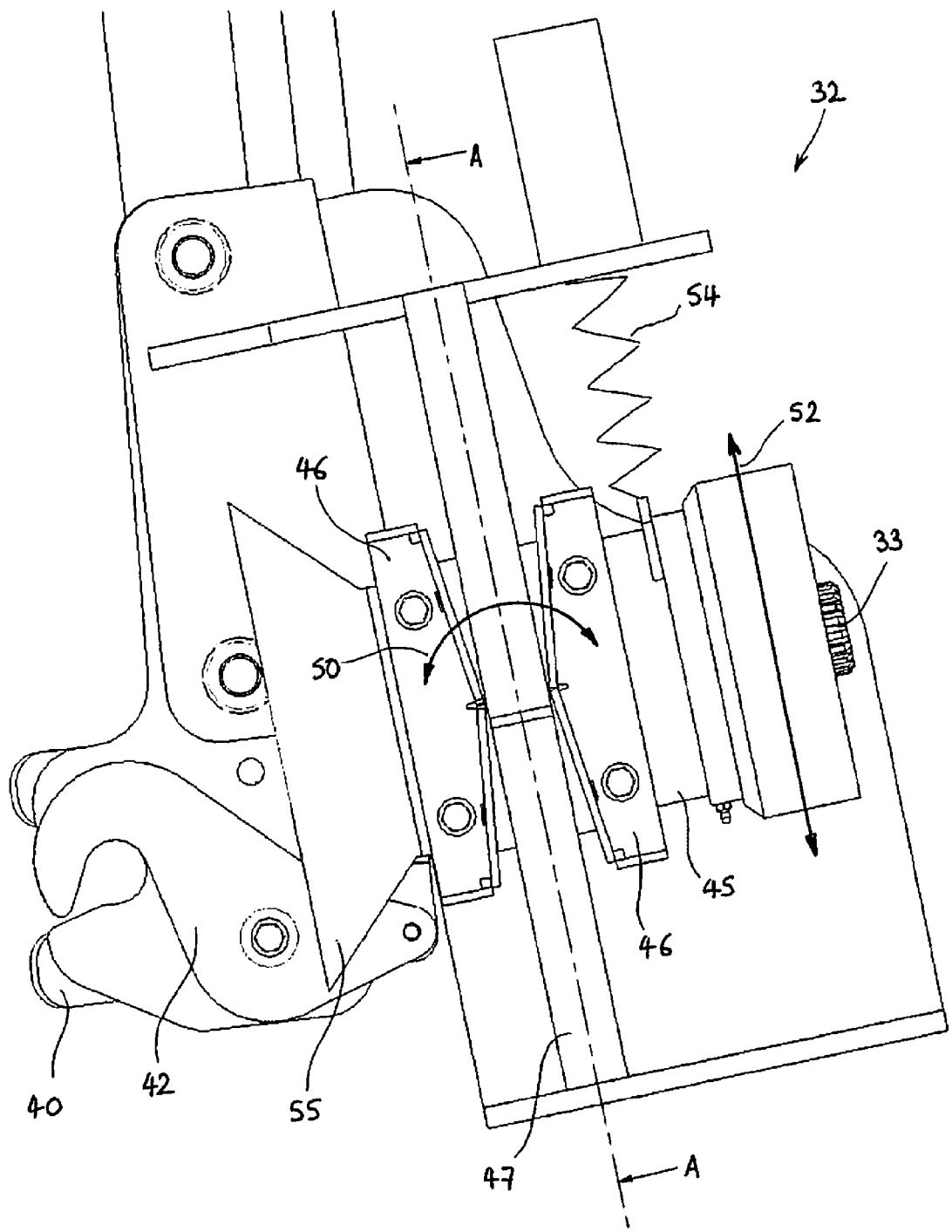
FIG. 4 shows a side view of the arrangement of FIG. 3.
Figure 7:
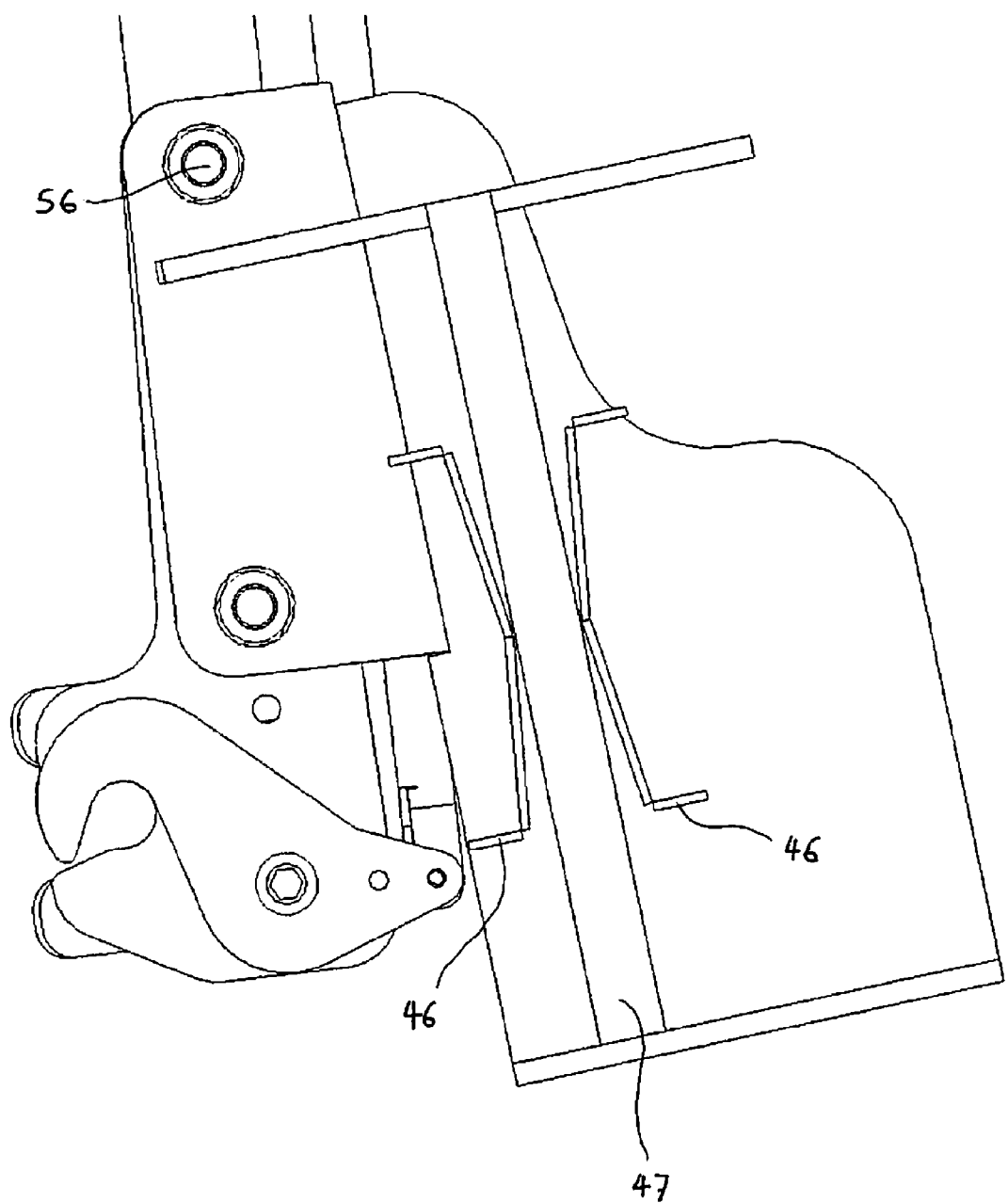
FIG. 7 shows section view B-B (FIG. 3)

A detail of the quick coupling arrangement 32 is shown in FIGS. 3 and 4. The quick coupling arrangement 32 consists of a drive connector 45 which provides connection on one side to the driven shaft 33 from the harvester and on the other side a connection to the header drive shaft 34. The drive connector 45 is movable via guiding rails 46 within a limiting frame 47. The limiting frame 47 defines a plane, and the shaping of the guiding rails 46 (shown in sectional view in FIG. 7) is such as to permit a limited amount of tilting movement (indicated by arrow 50) of the drive connector 45 relative to a normal direction of the plane.

Figure 8:
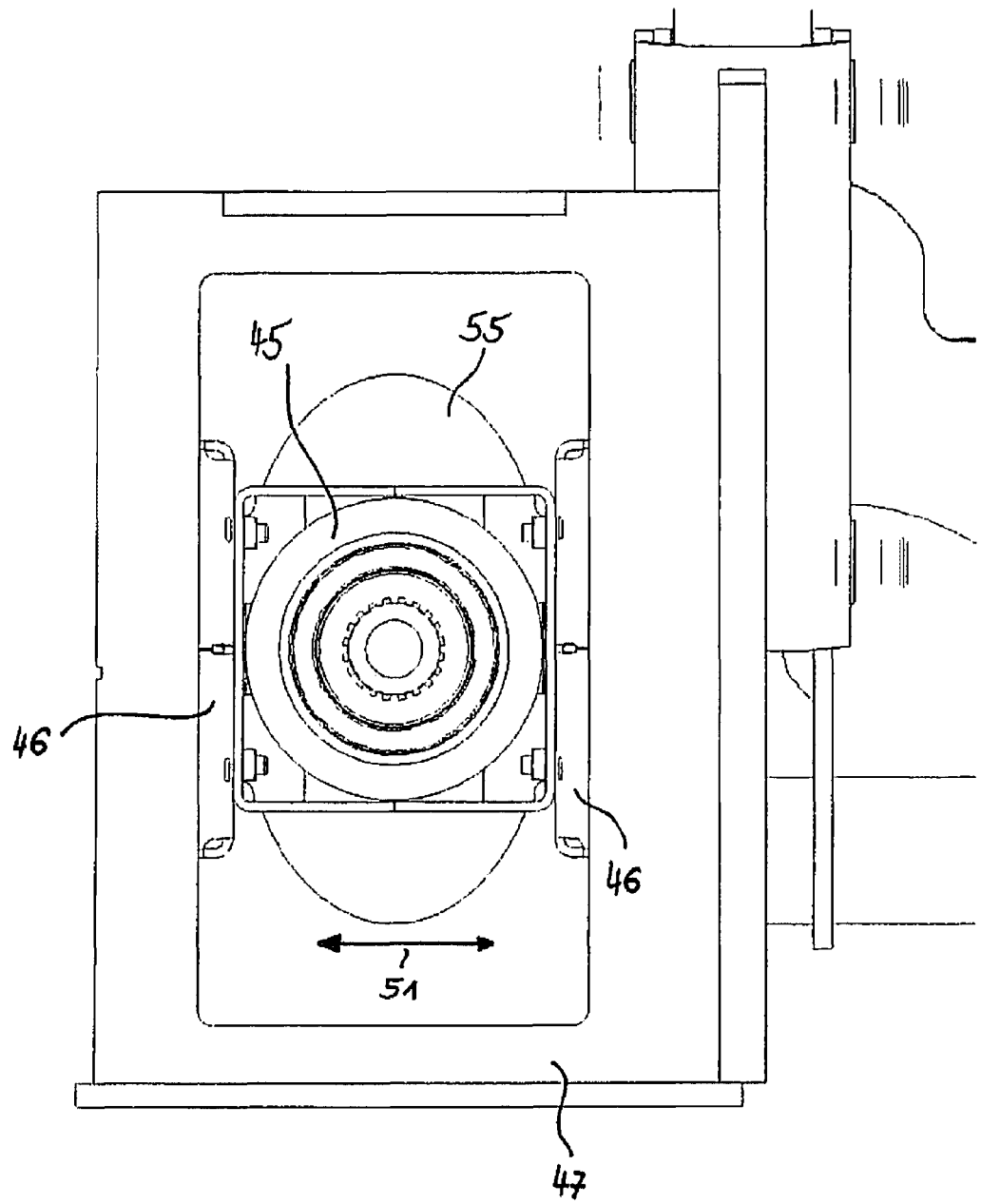
FIG. 8 shows section view A-A (FIG. 4).

The limiting frame 47 further defines an aperture within which the drive connector 45 may move. As also shown in FIG. 8, in the lateral direction the aperture is only slightly wider than the drive connector 45, less than the extent of overlap of the guiding rails 46 and frame 47, such that a small amount of movement of the drive connector 45 in the lateral direction (indicated by arrow 51; FIG. 3) is permitted. A greater degree of movement is permitted in the vertical direction (indicated by arrow 52; FIG. 4), with the drive connector 45 being urged to a central "zero" position by one or more springs 54 between the drive connector and frame 47. The drive shaft 34 of the header is guided to engagement with the quick coupling arrangement 32 via a funnel-shaped portion 55 at the forward side of the drive connector, as will be described in greater detail below.

Figure 5:
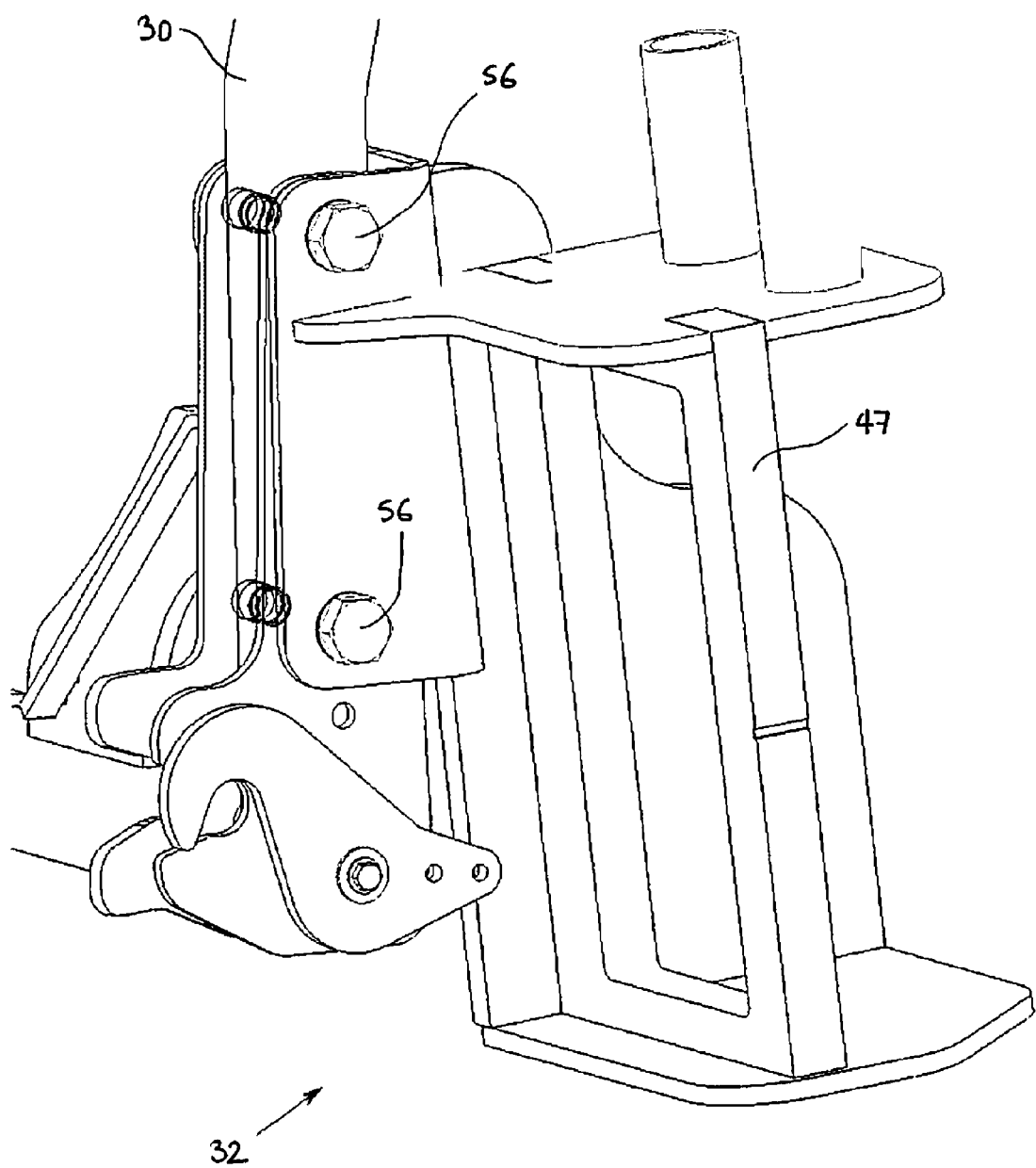
FIG. 5 shows the arrangement of FIG. 3 with the drive connector omitted.

FIG. 5 shows the attachment of the quick coupling arrangement 32 to the frame 30, with the drive connector, guide rails and funnel-shaped portions omitted for reasons of clarity. The limiting frame 47 of the quick coupling arrangement 32 is fixed by bolts or screws 56 to the frame 30, although it will be readily understood that other fixing methods such as welding may instead be used.

Figure 6A:
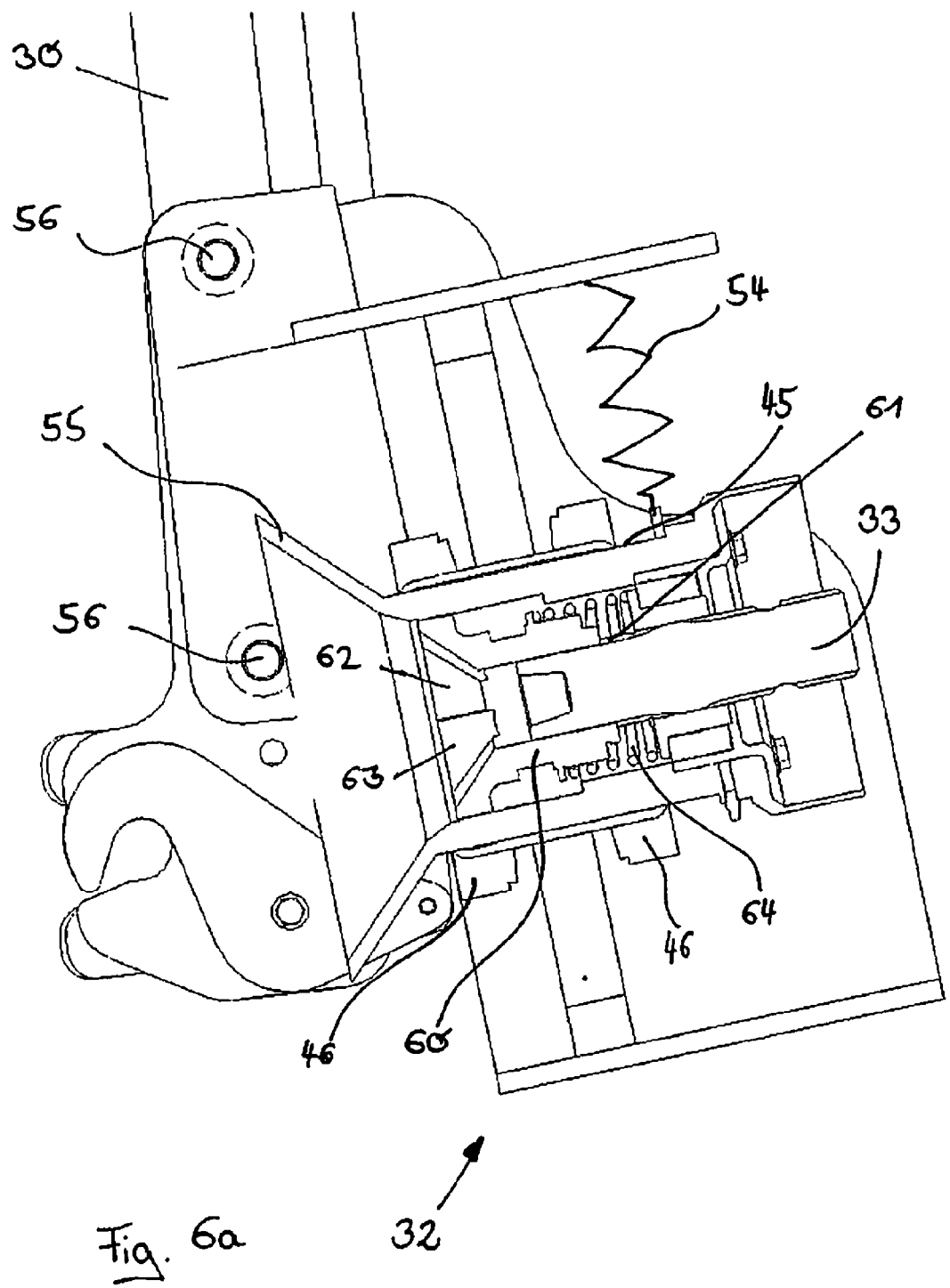
FIGS. 6a to 6c show section views C-C (FIG. 3) with different positions of the drive connector.
Figure 6B:
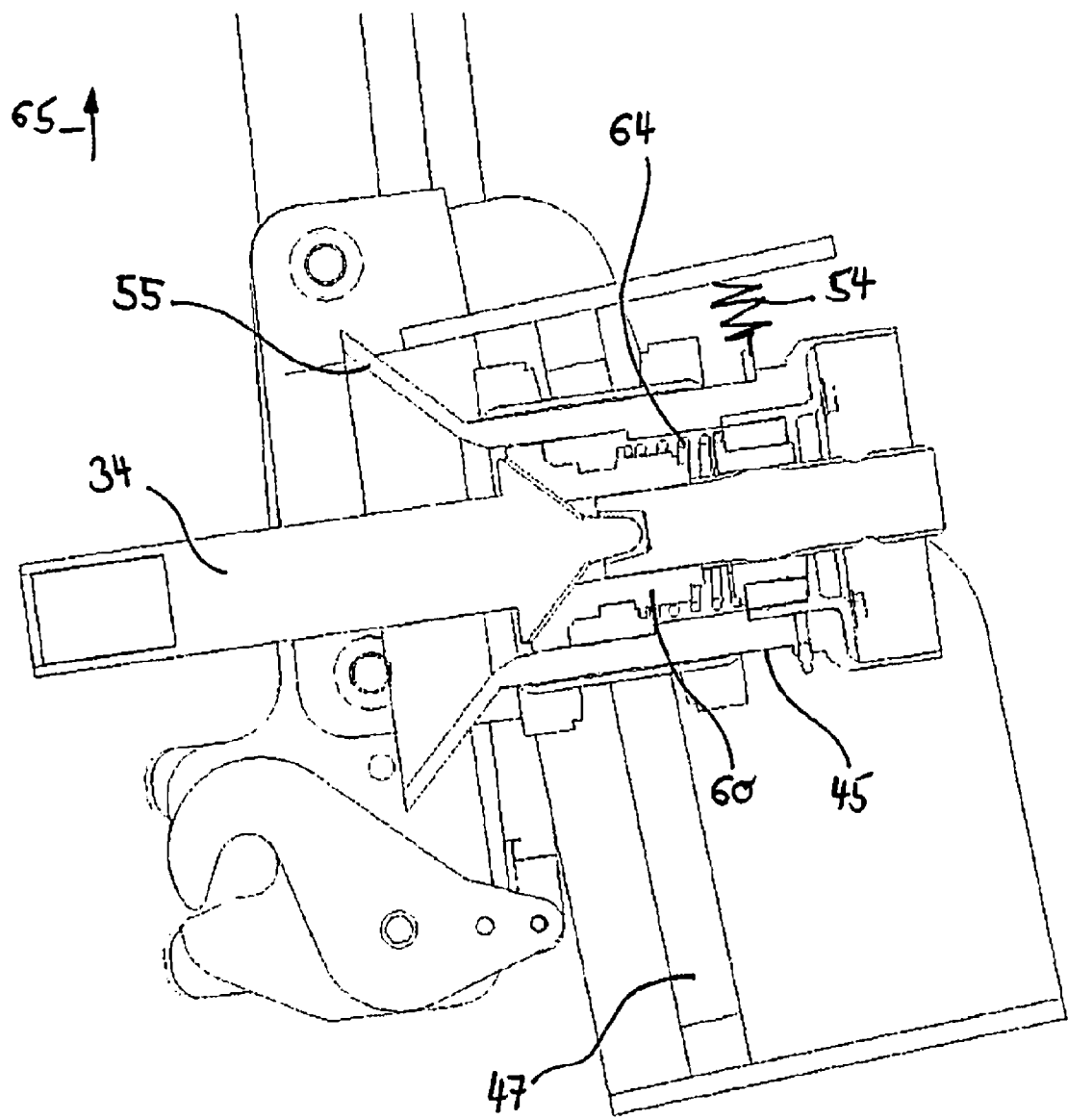
Figure 6C:
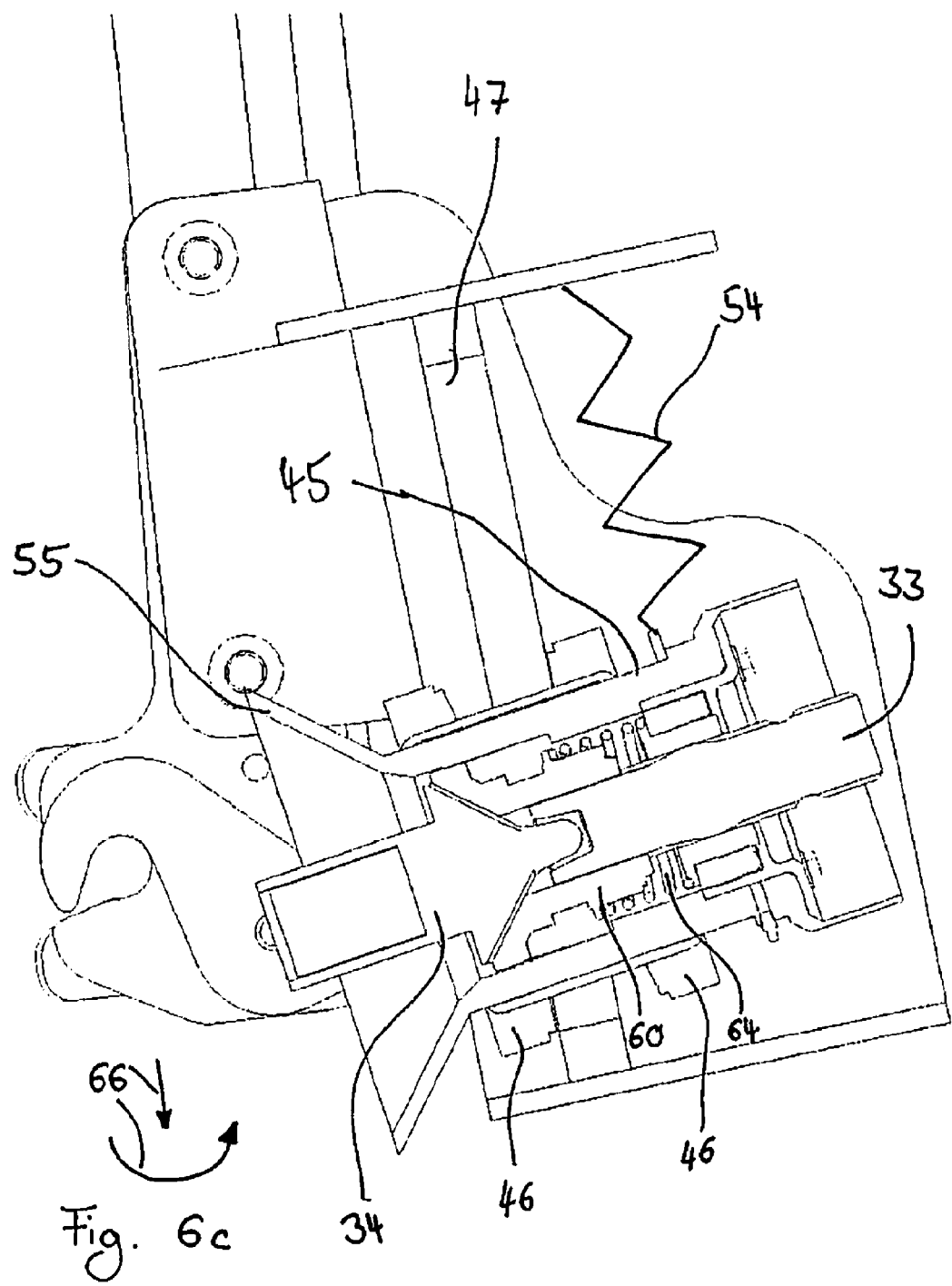

FIGS. 6a-6c illustrate the engagement of the header drive shaft 34 by the quick coupling arrangement 32 and differing positions that may be taken by the coupling arrangement, for example to accommodate headers from two different manufacturers having different positions of the header drive shaft 34 relative to the mounting bars 39, 41 (FIG. 1). These views are taken on section line C-C (FIG. 3).

In FIG. 6a, the drive connector 45 is in the zero position, and the header drive shaft is not engaged. Within the drive connector 45 a generally cylindrical and hollow link body 60 is rotatably mounted. The hollow link body 60 is slidably mounted to the forward end of the drive shaft 33 and one or more splines or teeth 61 on the outer surface of the drive shaft engage corresponding recesses in the inner surface of the link body to bring the two components into driving engagement. At the forward end of the link body 60, the interior wall increases in diameter to provide a generally frusto-conical seat surface 62 having a number of radiating teeth or splines 63 thereon.

In FIG. 6b, the header drive shaft 34 is engaged with the quick coupling mechanism (the remainder of the header is omitted for clarity). The free end of the drive shaft 34 is of generally conical form with radial splines or teeth across the conical surface. As the harvester moves to engage the header mounting bars 39, 41 (FIG. 1) the free end of the drive shaft 34 is captured by the funnel-shaped portion 55 of the drive connector which cooperates with the conical shaping of the end of the shaft to bring the shaft 34 into driving engagement with the frusto-conical seat surface 62 of the link body 60, whilst also causing the drive connector 45 to move within the aperture of the frame 47 such that the ends of the drive shaft 34 and driven shaft 33 are axially aligned and drivingly connected through the link body 60. A spring 64 arrangement around the link body 60 urges that body towards the drive shaft end to maintain a good engagement of the splines whilst the header is mounted.

As can be seen in FIG. 6b, making the connection has forced the drive connector 45 to be raised up and tilted in a clockwise direction (arrows 65) relative to the frame 47, with the connecting spring 54 being compressed. In contrast, FIG. 6c shows a connection orientation that has forced the drive connector 45 to be pushed down and tilted in a counter-clockwise direction (arrows 66) relative to the frame 47, with the connecting spring 54 being extended. Other positions between the extremes of FIGS. 6b and 6c are of course possible.

In the foregoing we have described a drive arrangement for a harvesting header of a harvesting machine having a running gear on which a feeder housing is mounted. A front side of the feeder housing has a header mount that moves relative to the feeder housing and on which a harvesting header is detachably fastened. An automated coupling mechanism is provided to link a driven shaft from the harvesting machine to a drive shaft of the harvesting header as the header is connected to the harvesting machine. The coupling mechanism connected with the header mount is movable relative thereto during the attachment of the harvesting header to accommodate differing header drive shaft orientations.

From reading of the present disclosure, other modifications will be apparent to those skilled in the art. Such modifications may involve other features which are already known in the field of harvesting machines and component parts therefore and which may be used instead of or in addition to features described herein. For example, the orientation of the quick coupling arrangement described above may be turned through ninety degrees to give a greater range of movement of the drive connector in the lateral (rather than vertical) direction, or the limiting frame 47 may be extended such as to give a greater range of movement in both lateral and vertical directions. Whilst the embodiments described above show the use of only a single spring constraining movement of the drive connector relative to the frame, it will be apparent that arrangements of multiple springs may be used.

The invention claimed is:

1. A drive arrangement for a harvesting header of a harvesting machine having a running gear on which a feeder housing is mounted, a front side of the feeder housing having a header mount that that is movable relative to the feeder housing and on which the harvesting header is detachably fastened by a number of fixed mounting points of the header mount, the drive arrangement comprising:
   a driven shaft that is set in rotation by the harvesting machine and is connected with the header mount by a quick coupling arrangement; and
   a harvesting header drive shaft connected to the driven shaft in a driving way by the quick coupling arrangement configured to separate said driven shaft and said drive shaft when the harvesting header is disassembled from the header mount and configured to connect said driven shaft and said drive shaft when the harvesting header is attached on the header mount, characterized in that the quick coupling arrangement is connected with the header mount and is movable relative to the header mount during attachment of the harvesting header, wherein the quick coupling arrangement includes a limiting frame defining a plane and an aperture through which a drive connector passes, the drive connector being movable within the aperture, wherein movement of the drive connector parallel to the plane and within the aperture is constrained in at least one direction in the plane by a spring.

2. The drive arrangement as claimed in claim 1, in which the quick coupling arrangement includes guidance means shaped to axially align the driven shaft and the drive shaft during attachment of the harvesting header to the header mount.

3. The drive arrangement as claimed in claim 2, in which the guidance means comprises a funnel-shaped portion connected with one end of either the drive shaft or the driven shaft configured to guide an unconnected end of the other of the drive shaft or driven shaft into alignment with said connected end of the drive shaft or driven shaft during attachment of the harvesting header to the header mount.

4. The drive arrangement as claimed in claim 1, wherein the driven shaft and drive connector are drivingly connected by a link body comprising a spline shaft.

5. The drive arrangement as claimed in claim 4, wherein the limiting frame further comprises guiding rails configured to limit an extent of tilting of the drive connector relative to a normal to the plane.

6. The drive arrangement as claimed in claim 4, wherein the drive connector includes a spring arrangement configured to urge the engagement of the drive connector and the driven shaft when the header is mounted to the header mount.

7. The drive arrangement as claimed in claim 1, wherein the fixed mounting points of the header mount are configured to engage a number of corresponding mounts of the harvesting header when said header is mounted to the header mount.

8. The drive arrangement as claimed in claim 7, wherein at least one of the fixed mounting points of the header mount further comprises a locking mechanism configured to retain the corresponding mount of the harvesting header when said header is mounted to the header mount.

9. The drive arrangement as claimed in claim 8, wherein the locking mechanism is configured to engage or release the corresponding mount of the harvesting header as the header is attached or disassembled from the header mount.

* * * * *